United States Patent [19]

Gill

[11] 4,174,699

[45] Nov. 20, 1979

[54] ENGINE OIL PROCESSING SYSTEM

[75] Inventor: Lloyd T. Gill, Okemos, Mich.

[73] Assignee: General Motors Corporation, Detroit, Mich.

[21] Appl. No.: 864,528

[22] Filed: Dec. 27, 1977

[51] Int. Cl.² ............................................. F01M 1/02
[52] U.S. Cl. ............................ 123/196 S; 123/196 A; 184/6.4
[58] Field of Search ..................... 123/196 A, 196 S; 184/1.5, 6.24, 6.4, 6.21, 6.22

[56] References Cited

U.S. PATENT DOCUMENTS

| | | | |
|---|---|---|---|
| 1,379,259 | 5/1921 | Hans | 184/6.24 |
| 1,766,847 | 6/1930 | Tibbets | 184/6.24 |
| 2,010,430 | 8/1935 | Howard | 184/6.24 |
| 2,268,653 | 1/1942 | Flowers | 184/6.24 |
| 2,365,166 | 12/1944 | Bay | 123/196 AB |
| 2,639,783 | 5/1953 | Kovacs | 184/6.24 |
| 2,928,499 | 3/1960 | Nallinger | 184/6.24 |
| 3,805,921 | 4/1974 | Marion | 184/6.24 |

Primary Examiner—Ronald H. Lazarus
Attorney, Agent, or Firm—D. D. McGraw

[57] ABSTRACT

An engine oil cooling and filtering arrangement with a valve controlled bypass for the cooler and another valve controlled bypass for the filter.

5 Claims, 9 Drawing Figures

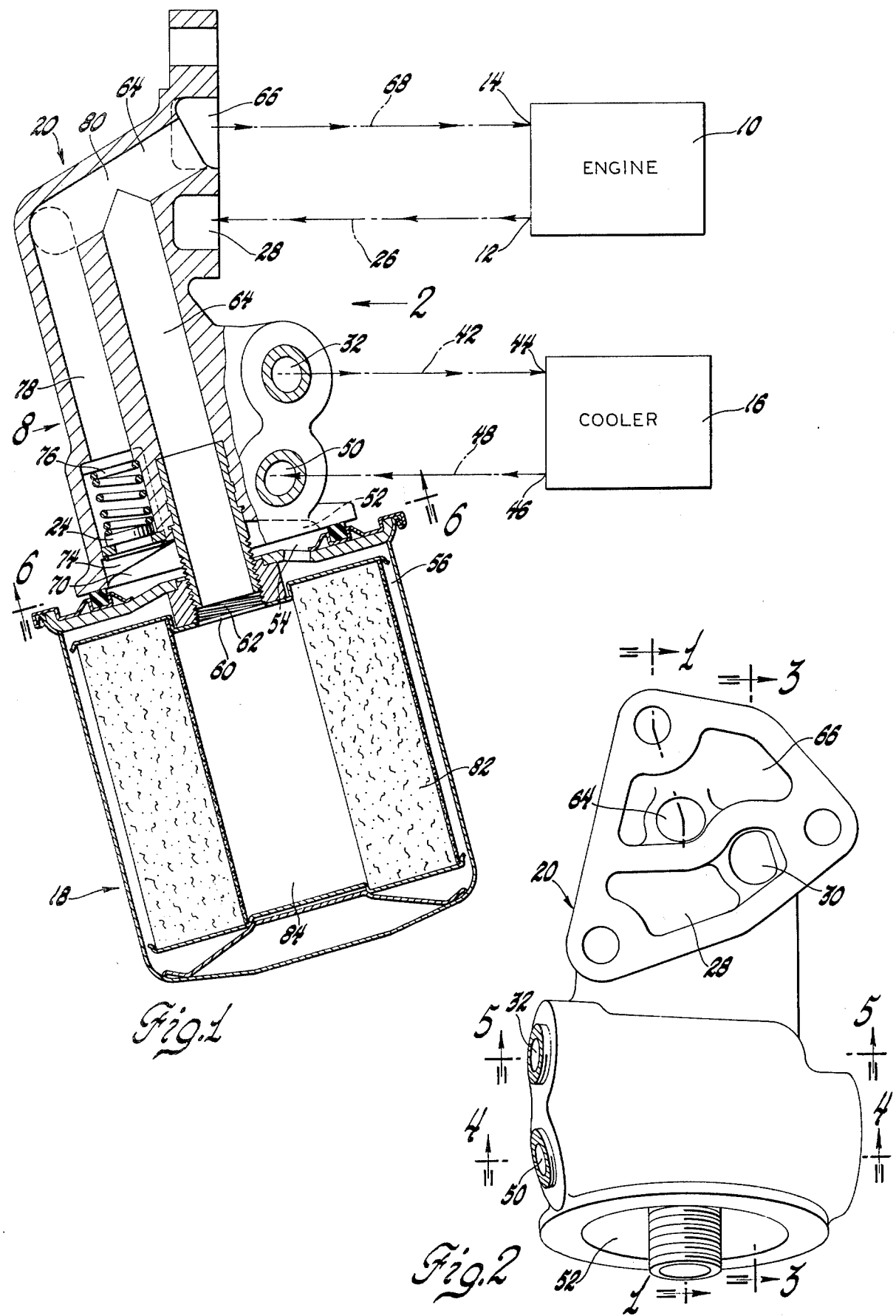

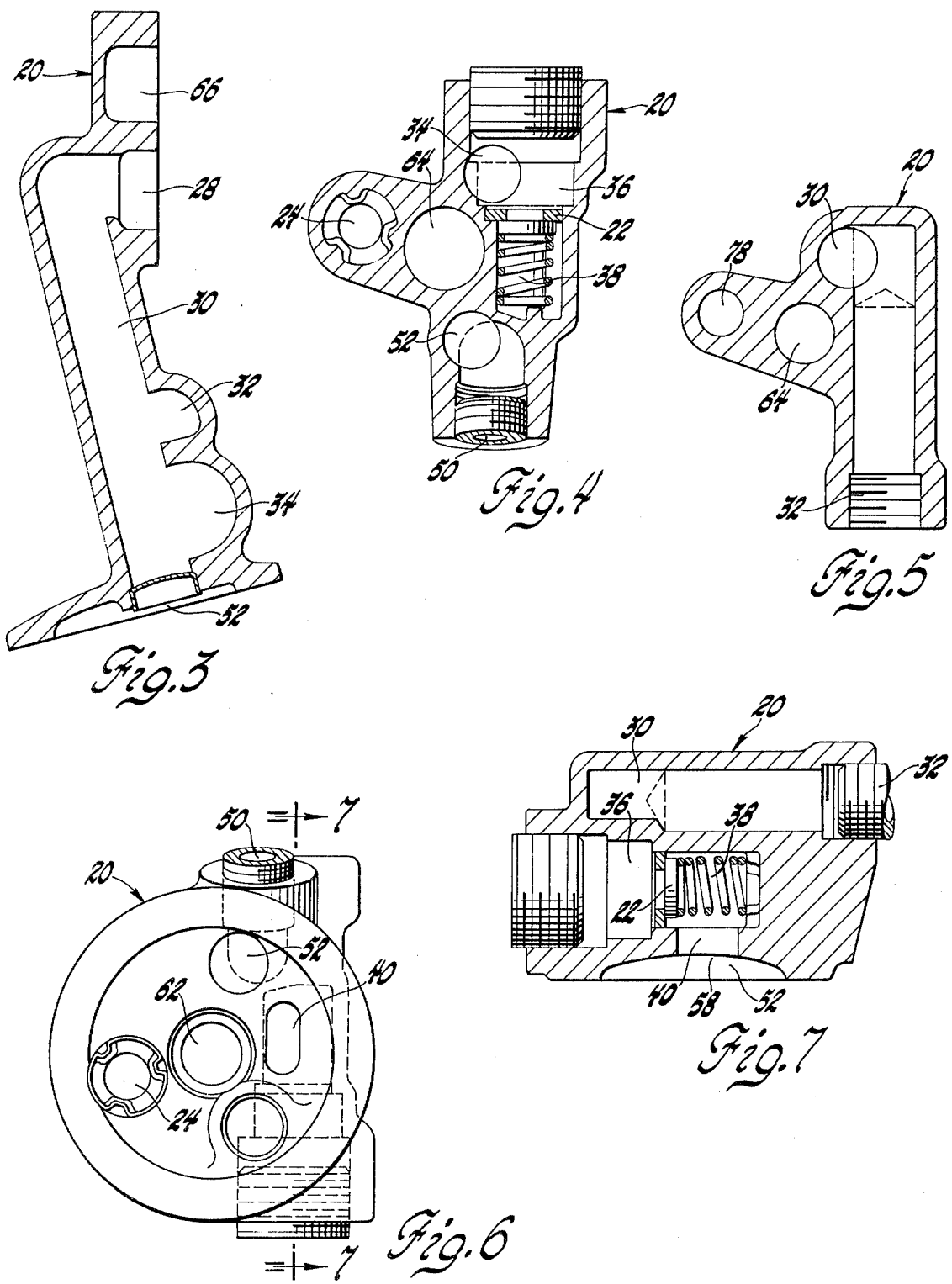

ENGINE OIL PROCESSING SYSTEM

The invention relates to an engine oil processing system and more particularly to one in which the hot, dirty oil from the running engine is processed through an oil cooler and an oil filter to return cool, clean oil to the engine. The hot, dirty oil may be bypassed in part or totally around the oil cooler if the oil cooler develops a sufficient resistance to oil flow therethrough. Such resistance may occur because of partial or total blockage of flow through the cooler. The oil delivered from the cooler and/or the cooler bypass valve is then passed through an oil filter to be cleaned. The filter is also provided with a bypass valve which is normally closed and which may pass some or all of the oil around the filter if the filter develops sufficient resistance to oil flow therethrough. Thus, in normal engine operation, the engine is provided with cool, clean oil but is assured a supply of oil if either the cooler of the filter, or both, have a partial or a complete blockage against oil flow therethrough.

IN THE DRAWINGS

FIG. 1 is an elevation view, with parts broken away and in section, illustrating an oil filter base for an engine and schematically showing the base connected to the engine and an oil cooler, the oil filter being installed on the filter base. The section portion is taken in the direction of arrows 1—1 of FIG. 2.

FIG. 2 is an elevation view of the filter base shown in FIG. 1 taken generally in the direction of arrow 2 of FIG. 1.

FIG. 3 is a cross section view of a part of the filter base of FIGS. 1 and 2 taken in the direction of arrows 3—3 of FIG. 2.

FIG. 4 is a cross section view of a part of the filter base taken in the direction of arrows 4—4 of FIG. 2.

FIG. 5 is a cross section view of a part of the filter base taken in the direction of arrows 5—5 of FIG. 2.

FIG. 6 is an elevation view of a part of the filter base with the filter removed and taken in the direction of arrows 6—6 of FIG. 1.

FIG. 7 is a cross section view of a part of the filter base taken in the direction of arrows 7—7 of FIG. 6.

Figure 8:
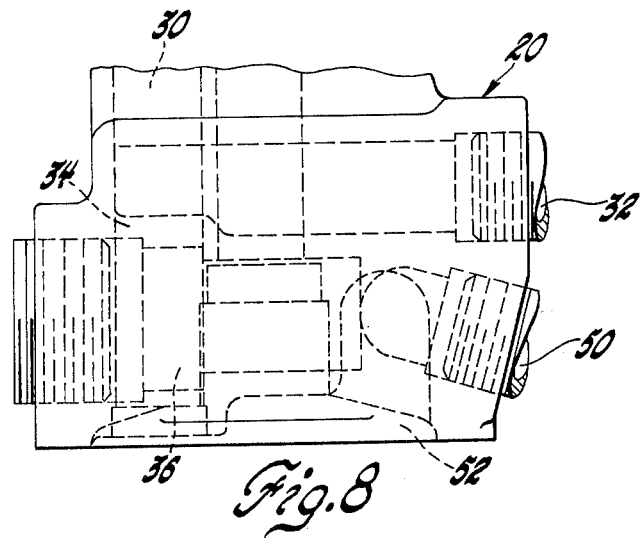
FIG. 8 is an elevation view of a part of the filter base with parts broken away and portions shown in phantom and taken in the direction of arrow 8 of FIG. 1.
Figure 9:
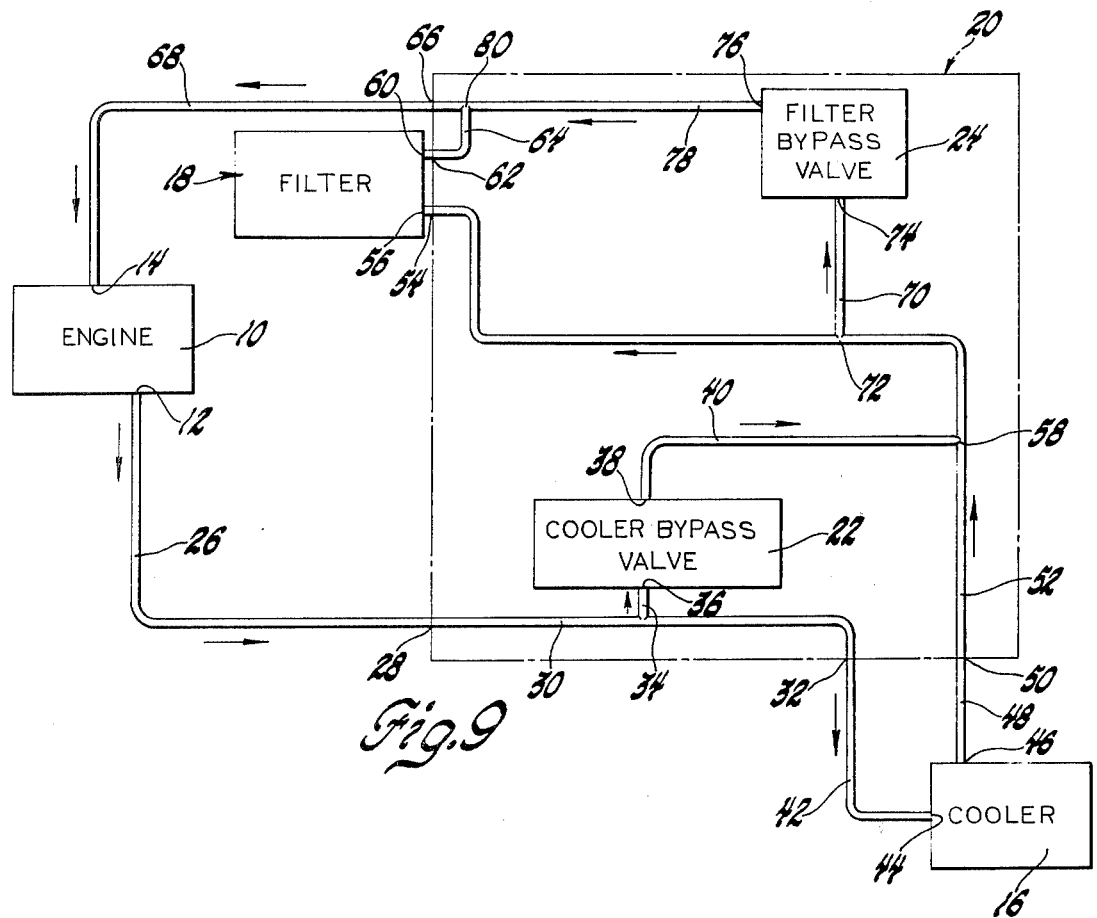
FIG. 9 is a schematic representation of the oil processing system embodying the invention.

In order to set forth the system, reference is initially made to the schematic representation shown in FIG. 9. The engine 10 has a lubricating system which requires engine lubricating oil to be continuously circulated through the engine while the engine is running. The engine, therefore, has an outlet 12 which discharges hot, dirty oil and an oil inlet 14 which receives oil after it has been processed for reuse by the engine. It is desirable that this oil be cool, clean oil, and such is normally the case. In order to cool and clean the oil, it is circulated through a cooler 16 and a filter 18. A filter base 20 is provided on an appropriate portion of the engine 10 to arrange for connections between the engine outlet 12 and inlet 14 as well as the connections to and from cooler 16 and filter 18. It also provides for suitable mounting of the filter 18 on the engine. Filter base 20 also includes a cooler bypass valve 22 and a filter bypass valve 24 as well as suitable passages to conduct the oil through the processing system. Schematically, the hot, dirty oil leaving engine 10 at outlet 12 flows through a passage 26 to an inlet 28 of filter base 20, through a passage 30 in the filter base and to an outlet 32 of the filter base. Internally of the filter base, passage 30 is connected with a passage 34 which leads to an inlet 36 of the cooler bypass valve 22. This valve has an outlet 38 to which an internal passage 40 in filter base 20 is connected. A conduit 42 is connected from outlet 32 to an inlet 44 of cooler 16. The outlet 46 of the cooler is connected by another conduit 48 to another filter base inlet 50. Another internal passage 52 in filter base 20 connects inlet 50 with an outlet 54 from the filter base which leads to the inlet 56 of filter 18. Passage 40 is connected to passage 52 as shown at 58. The outlet 60 of filter 18 is in fluid communication with another inlet 62 of filter base 20. Another internal passage 64 in filter base 20 is connected with another filter base outlet 66. Passage 68 connects outlet 66 with the engine inlet 14. Internal passage 70 in filter base 20 is connected at 72 with internal passage 52 and leads to the inlet 74 of the filter bypass valve 24. Valve 24 has an outlet 76 connected to filter base internal passage 78, which is connected at 80 with internal passage 64.

Under normal conditions of operation with engine 10 running, hot, dirty oil passes from engine outlet 12 through passage 26, inlet 28, passage 30, outlet 32, conduit 42, inlet 44, through cooler 16 where it is cooled, outlet 46, conduit 48, inlet 50, passage 52, outlet 54, inlet 56, through filter 18 where it is cleaned, outlet 60, inlet 62, passage 64, outlet 66, passage 68, and returns to the engine at engine inlet 14. After it flows through the cooler it becomes cool, dirty oil. After it flows through the filter it becomes cool, clean oil.

Either cooler 16 or filter 18, or both, may become partially or totally blocked so as to restrict or prevent engine oil flow therethrough. Since the engine must maintain its lubricating system, it is necessary to return oil to the engine inlet 14 even if it has not been fully processed, or even processed at all. Thus, various operating modes can occur, depending upon the amount of restriction in the cooler or the filter, or both. The cooler bypass valve 22 is set to open to some extent to begin bypassing hot, dirty oil around cooler 16 when a flow restriction in cooler 16 causes a sufficient back pressure. If the flow through the cooler is fully blocked, valve 22 will fully open to bypass all of the hot, dirty oil from the engine around the cooler.

As long as filter 18 permits full flow therethrough, the filter bypass valve 24 is closed. If the filter offers sufficient restriction to oil flow therethrough, bypass valve 24 will begin to open and bypass oil around filter 18. If the filter becomes totally blocked against oil flow therethrough, valve 24 will open sufficiently to bypass all of the oil around filter 18. Any of the oil flowing through valve 24 is delivered to the engine inlet 14 without being filtered.

Because of various possible conditions, varying amounts of hot and cool, clean and dirty oil may be delivered to the engine inlet. For clarity, the following chart showing the nine different modes of operation, depending upon the amount of flow through the cooler and the filter, present the various possibilities. The abbreviations used in the chart are:

HD—Hot, Dirty Oil.
CD—Cool, Dirty Oil.
HC—Hot, Clean Oil.
CC—Cool, Clean Oil.
X—The condition existing for that mode.

| MODE | OIL FROM ENG. | COOLER | | | | | COOLER BYPASS VALVE | | | | |
|---|---|---|---|---|---|---|---|---|---|---|---|
| | | IN | FULL FLOW | PART FLOW | NO FLOW | OUT | IN | CLOS | PART OPEN | FULL OPEN | OUT |
| 1 | HD | HD | X | | | CD | | X | | | |
| 2 | HD | HD | | X | | CD | | X | | | |
| 3 | HD | HD | X | | | CD | | X | | | |
| 4 | HD | HD | | X | | CD | HD | | X | | CD |
| 5 | HD | HD | | X | | CD | HD | | X | | CD |
| 6 | HD | HD | | X | | CD | HD | | X | | CD |
| 7 | HD | | | | X | | HD | | | X | HD |
| 8 | HD | | | | X | | HD | | | X | HD |
| 9 | HD | | | | X | | HD | | | X | HD |

| MODE | FILTER | | | | | FILTER BYPASS VALVE | | | | | OIL INTO ENGINE |
|---|---|---|---|---|---|---|---|---|---|---|---|
| | IN | FULL FLOW | PART FLOW | NO FLOW | OUT | IN | CLOS | PART OPEN | FULL OPEN | OUT | |
| 1 | CD | X | | | CC | | X | | | | CC |
| 2 | CD | | X | | CC | CD | | X | | CD | CC CD |
| 3 | | | | X | | CD | | X | | CD | CD |
| 4 | HD CD | X | | | HC CC | | X | | | | HC CC |
| 5 | HD CD | | X | | HC CC | HD CD | | X | | HD CD | HC HD CC CD |
| 6 | | | | X | | HD CD | | | X | HD CD | HD CD |
| 7 | HD | X | | | HC | | X | | | | HC |
| 8 | HD | | X | | HC | HD | | X | | HD | HC HD |
| 9 | | | | X | | HD | | | X | HD | HD |

The structures shown in FIGS. 1–8 show the physical arrangements of a preferred embodiment of the invention. The same reference numerals are utilized on the physical structure in accordance with comparable parts on the schematic representation of FIG. 9. The filter base 20 is fastened to the engine block, as is well known, on the filter is a screw-on replacement cartridge. The cooler is suitably mounted for heat exchange and conduits 42 and 48 are pipes or tubes which connect the cooler to the filter base. Filter 18 is of the full flow type with the dirty oil entering through plenum 52 and being distributed around the outside of the annular filter element 82. As the oil passes through element 82, it is cleaned. It flows from the center 84 of element 82, which acts as the filter outlet 60 to the inlet 62 of the filter base.

What is claimed is:

1. An engine lubricating oil processing system comprising:
   an engine when running normally receiving cool, clean lubricating oil and discharging hot, dirty lubricating oil;
   a filter base secured to said engine and having a first inlet receiving the hot, dirty oil discharged from said engine, a first outlet, and a first passage connecting said first inlet and said first outlet and conducting to said first outlet the hot, dirty oil received by said first inlet;
   an oil cooler having an inlet connected with said filter base first outlet to receive hot, dirty oil therefrom, and an outlet to discharge cool, dirty oil; said oil cooler removing heat from the oil passing therethrough;
   said filter base having a second inlet and a second outlet connected in fluid flow relation by a second passage in said base, said second inlet receiving oil from said cooler outlet;
   an oil filter associated with said filter base and having an inlet and an outlet, said filter inlet receiving oil from said filter base second outlet;
   said filter base having a third inlet and a third outlet connected in fluid flow relation by a third passage in said base, said filter outlet being connected to said filter base third inlet to deliver cool, clean oil thereto, and said filter base third outlet being connected to deliver oil to said engine;
   said filter base having an oil cooler bypass valve therein provided with an inlet and an outlet with the inlet thereof fluid connected to said first passage between said filter base first inlet and first outlet to receive the hot, dirty oil from said engine, and the cooler bypass valve outlet fluid connected to said second passage between said filter base second inlet and second outlet; said cooler bypass valve opening, only upon a predetermined back pressure caused by undue oil flow restriction in said cooler, to bypass a predetermined limited amount of hot, dirty oil from said base first passage to said base second passage without passing through said cooler;
   said filter base further having a filter bypass valve therein provided with an inlet and an outlet with the inlet thereof fluid connected to said filter base second passage between said filter base second inlet and second outlet to receive cool, dirty oil from said cooler and any bypassed hot, dirty oil from said cooler bypass valve, said filter bypass valve outlet being fluid connected to said filter base third passage; said filter bypass valve opening, only upon a predetermined back pressure caused by undue oil flow restriction in said filter, to bypass a predetermined limited amount of oil flowing through said filter base second passage to said filter base third passage without passing through said filter; said system operating
   When both of said bypass valves are closed to deliver hot, dirty oil to said cooler from said engine; remove heat from that oil; deliver cool, dirty oil to said filter; clean that oil; and return cool, clean oil to said engine;

When said cooler bypass valve is open to deliver a mixture of hot, dirty oil and cool, dirty oil to said filter; and when said filter bypass valve is open to deliver a mixture of dirty and clean oil to said engine which will be cool oil when said cooler bypass valve is closed and will be a mixture of hot and cool oil when said cooler bypass valve is also open.

2. An engine lubricating oil processing system comprising:
   an engine being lubricated by oil circulated therethrough and having an oil outlet discharging hot, dirty oil when the engine is running and having an oil inlet receiving lubricating oil when the engine is running;
   an oil cooler unit and an oil filter unit in series and receiving the hot, dirty oil from said engine outlet and normally returning cool, clean oil to said engine oil inlet;
   cooler unit bypass means for said oil cooler unit and filter unit bypass means for said oil filter unit;
   each of said bypass means bypassing oil around the unit with which it is associated when the unit with which it is associated becomes incapable of passing the full flow of oil therethrough, said bypass means being independently operable relative to each other, said engine being assured a continuous supply of lubricating oil at said oil inlet irrespective of the functioning level of said cooler and filter units.

3. An engine oil processing system for an engine which, when running normally, receives cool, clean lubricating oil from said system and discharges hot, dirty lubricating oil to said system, said system comprising:
   a lubricating oil cooler having a bypass valve for bypassing lubricating oil only around said cooler and only when all of the oil flowing through said system cannot pass through said cooler;
   a lubricating oil filter having a bypass valve for bypassing lubricating oil only around said filter and only when all of the oil flowing through said system cannot pass through said filter;
   said cooler and said filter being arranged in series flow relation so that one of them is in position to process the oil before the other is in position to process the oil.

4. The method of processing engine lubricating oil for a running engine which discharges hot, dirty oil and receives processed oil in a continuous flow, said method comprising the steps of:
   (a) normally cooling all of the oil discharged from the engine;
   (b) normally cleaning all of the oil discharged from the engine;
   (c) and returning the cooled, cleaned oil to the engine;
   (d) independently bypassing at least some of the oil discharged from the engine so that the oil so bypassed is not cooled when step (a) is either partially or totally incapable of being performed;
   (e) independently bypassing at least some of the oil discharged from the engine so that the oil so bypassed is not cleaned when step (b) is either partially or totally incapable of being performed; and
   (f) delivering the oil so bypassed together with any oil not so bypassed to the engine steps (d) and (e) being operable independently of each other.

5. A method of operating an engine lubricating oil processing system to normally cool and clean lubricating oil received from the engine and then return the oil to the engine while assuring a continuous supply of lubricating oil to the engine when either cooling or cleaning, or both, cannot be fully performed, said method comprising the steps set forth with each of the tabulated modes of operation in the following chart, wherein the abbreviations used in the chart have the following meanings:
   (a) CLOS—Closed;
   (b) HD—Hot, dirty oil;
   (c) CD—Cool, dirty oil;
   (d) HC—Hot, clean oil;
   (e) CC—Cool, clean oil; and
   (f) X—Indicates the operative condition of the relevant system element for the tabulated mode

| MODE | OIL FROM ENG. | COOLER | | | | | COOLER BYPASS VALVE | | | | |
|---|---|---|---|---|---|---|---|---|---|---|---|
| | | IN | FULL FLOW | PART FLOW | NO FLOW | OUT | IN | CLOS | PART OPEN | FULL OPEN | OUT |
| 1 | HD | HD | X | | | CD | | X | | | |
| 2 | HD | HD | X | | | CD | | X | | | |
| 3 | HD | HD | X | | | CD | | X | | | |
| 4 | HD | HD | | X | | CD | HD | | X | | CD |
| 5 | HD | HD | | X | | CD | HD | | X | | CD |
| 6 | HD | HD | | X | | CD | HD | | X | | CD |
| 7 | HD | | | | X | | HD | | | X | HD |
| 8 | HD | | | | X | | HD | | | X | HD |
| 9 | HD | | | | X | | HD | | | X | HD |

| MODE | FILTER | | | | | FILTER BYPASS VALVE | | | | | OIL INTO ENGINE |
|---|---|---|---|---|---|---|---|---|---|---|---|
| | IN | FULL FLOW | PART FLOW | NO FLOW | OUT | IN | CLOS | PART OPEN | FULL OPEN | OUT | |
| 1 | CD | X | | | CC | | X | | | | CC |
| 2 | CD | | X | | CC | CD | | X | | CD | CC CD |
| 3 | | | | X | CD | | | X | CD | CD |
| 4 | HD CD | X | | | HC CC | | X | | | | HC CC |
| 5 | HD CD | | X | | HC CC | HD CD | | X | | HD CD | HC HD CC CD |
| 6 | | | | X | | HD CD | | | X | HD CD | HD CD |
| 7 | HD | X | | | HC | | X | | | | HC |
| 8 | HD | | X | | HC | HD | | X | | HD | HC HD |
| 9 | | | | X | | HD | | | X | HD | HD |

* * * * *